United States Patent
Kling et al.

(10) Patent No.: US 12,455,081 B2
(45) Date of Patent: Oct. 28, 2025

(54) METHOD FOR VISUALISING A PROGRAMME PLANNING, DIALOGUE INTERFACE THEREFOR AND COOKING DEVICE THEREFOR

(71) Applicant: RATIONAL AKTIENGESELLSCHAFT, Landsberg am Lech (DE)

(72) Inventors: Judith Kling, Landsberg am Lech (DE); Tanja Agapkin, Landsberg am Lech (DE); Simon Seemüller, Landsberg am Lech (DE)

(73) Assignee: Rational Aktiengesellschaft, Landsberg am Lech (DE)

( * ) Notice: Subject to any disclaimer, the term of this patent is extended or adjusted under 35 U.S.C. 154(b) by 906 days.

(21) Appl. No.: 17/632,872

(22) PCT Filed: Aug. 7, 2020

(86) PCT No.: PCT/EP2020/072294
§ 371 (c)(1),
(2) Date: Feb. 4, 2022

(87) PCT Pub. No.: WO2021/023875
PCT Pub. Date: Feb. 11, 2021

(65) Prior Publication Data
US 2022/0275945 A1    Sep. 1, 2022

(30) Foreign Application Priority Data
Aug. 8, 2019  (DE) .................... 102019121443.2

(51) Int. Cl.
G06F 3/048      (2013.01)
F24C 7/08       (2006.01)
G06F 3/04847    (2022.01)

(52) U.S. Cl.
CPC .......... *F24C 7/085* (2013.01); *G06F 3/04847* (2013.01)

(58) Field of Classification Search
CPC ............................ F24C 7/085; G06F 3/04847
See application file for complete search history.

(56) References Cited

U.S. PATENT DOCUMENTS

| | | | |
|---|---|---|---|
| 2012/0003364 A1* | 1/2012 | Kling | F24C 7/08 99/357 |
| 2013/0163956 A1* | 6/2013 | Medhurst | H04N 21/8547 386/E5.003 |

(Continued)

FOREIGN PATENT DOCUMENTS

EP    2211117 B1    7/2010

OTHER PUBLICATIONS

International Search Report dated Oct. 28, 2020 of International application No. PCT/EP2020/072294.

(Continued)

Primary Examiner — Mahelet Shiberou
(74) Attorney, Agent, or Firm — Jones Day

(57) ABSTRACT

The present invention relates to a method for visualizing programs for at least one cooking appliance, in which, after selection of at least two programs from a plurality of programs and their chronological order, the selected programs are displayed on at least one display device in a display area in each case in the form of at least one virtual receipt representing a program representative along a time axis to take account of the time sequence, wherein the extension of each displayed virtual receipt along the time axis is characteristic for a duration of the respectively associated program, and a time planning gap characterizing a pause region along the time axis between a first receipt and a second receipt following this first receipt in terms of time is at least partially closed automatically or triggered by a (Continued)

user by moving the second receipt towards the first receipt, in particular back to the left along the time axis extending in the x-direction, characterized by the following steps a) determining the presence of at least one planning gap between two chronologically consecutive receipts, b) displaying the determined planning gap at least once and/or outputting information about the determined planning gap and/or opening a dialogue interface to the determined planning gap, and c) at least partially closing the determined planning gap in response to a closure request. Furthermore, the invention relates to a dialogue interface and a cooking device for carrying out such a method.

23 Claims, 1 Drawing Sheet

(56) References Cited

U.S. PATENT DOCUMENTS

| | | | |
|---|---|---|---|
| 2018/0188947 A1* | 7/2018 | Bruin-Slot | F24C 7/082 |
| 2019/0113239 A1* | 4/2019 | Bruin-Slot | F24C 7/08 |
| 2020/0333016 A1* | 10/2020 | Chung | G06Q 90/00 |

OTHER PUBLICATIONS

Written Opinion dated Oct. 28, 2020 of International application No. PCT/EP2020/072294.

* cited by examiner

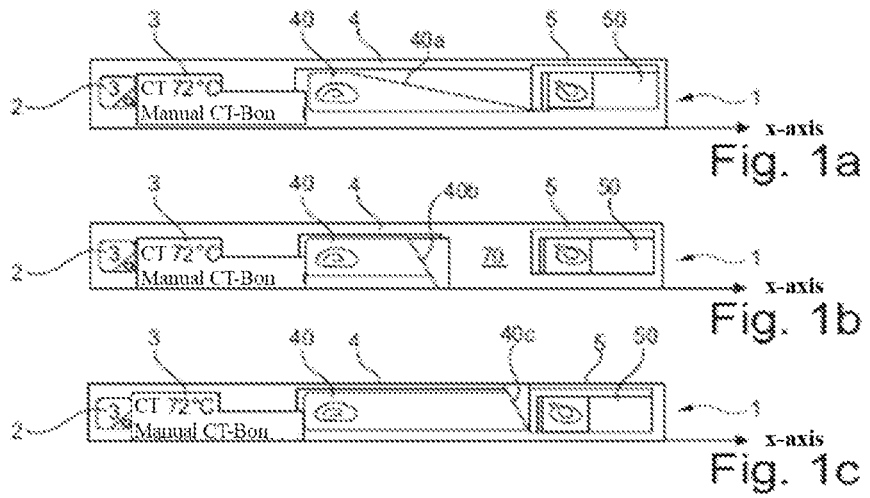
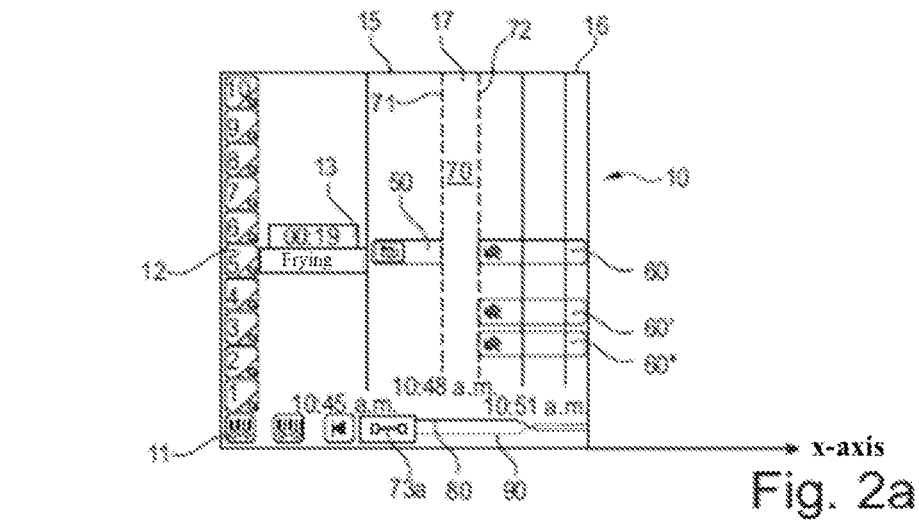

METHOD FOR VISUALISING A PROGRAMME PLANNING, DIALOGUE INTERFACE THEREFOR AND COOKING DEVICE THEREFOR

CROSS-REFERENCE TO RELATED APPLICATIONS

This application is a is a National Stage Entry of International Patent Application No. PCT/EP2020/072294, filed on Aug. 7, 2020, which claims the benefit of priority to German Patent Application No. DE 10 2019 121 443.2, filed on Aug. 8, 2019, each of which is hereby incorporated by reference in its entirety for all purposes.

BACKGROUND

1. Field

The present invention relates to a method for visualizing programs for at least one cooking appliance according to the preamble of claim 1, in which, after selection of at least two programs from a plurality of programs and their chronological order, the selected programs are displayed on at least one display device in a display area in each case in the form of at least one virtual receipt representing a program representative along a time axis to take account of the chronological order, wherein the extension of each displayed virtual receipt along the time axis is characteristic of a duration of the respectively assigned program. The invention further relates to a dialogue interface and a cooking appliance for performing such a method.

2. Related Art

From DE 10 2010 036 639 A1 it is known to arrange a representative of at least one section of a program executable in a cooking appliance, also referred to as a virtual receipt, in the display area of a display device relative to a time axis characteristic of the operation of at least one cooking appliance for visualizing the section, wherein at least one extension of the representative parallel to the time axis is characteristic of a duration of the section. Thereby, the extension parallel to the time axis automatically adapts to any change in the time requirement of the section during the course thereof, resulting from a determination of the time requirement carried out at at least two, preferably a plurality of, points in time during the course of the section, in order to visualize the inaccuracy of the determination of the time requirement. The relative position of two representatives to each other can be automatically changed along the time axis during operation of the cooking appliance in accordance with the accuracy of the determination of the time requirement.

EP 2 211 116 B1 relates to a method for visualizing programs for cooking appliances, in which, after selection of at least one program from a plurality of programs, the selected program is displayed on at least one display device in the form of at least one program representative, each program representative comprising a virtual receipt, wherein a program which comprises a plurality of sections is represented, in particular, by a virtual receipt with a plurality of partial receipts, and at least one parameter which is characteristic of the duration of the corresponding program or of the corresponding program section being visualized via a dimensioning of a virtual receipt or partial receipt. The course of the program on the corresponding receipt or the course of the program section on the corresponding partial receipt can be visualized, such as by optically highlighting at least one area of the receipt. The virtual receipts and/or partial receipts can also be changed via an input device, for example in the form of a repositioning.

DE 10 2008 032 450 A1 describes a method for changing at least one display of an operating menu of a cooking appliance on a display device of the cooking appliance after at least one actuation of an input device of the cooking appliance which is at least partially implemented with the display device for providing at least one input display. In this case, at least one area of the control menu, comprising a graphically displayed function and/or function group, an alphanumeric character string, an area and/or a symbol, in particular in the manner of a drag and drop function, can be moved by a swipe touch and/or at least two touches of the input display and/or a swipe past the input display.

The known methods have proven themselves in particular for the creation of time schedules, function schedules and/or function sequences of programs for cooking appliances. Nevertheless, there is a need for further development to close planning gaps, preferably independent of their origin.

WO 2010/086 340 A1 relates to a method for arranging representatives of programs selected from a plurality of programs for cooking appliances via at least one input device on at least one display device which is operatively connected to the input device and a control or regulating device, wherein the control or regulating device is operatively connected to a memory device for storing a plurality of programs for cooking appliances and is connected to at least one cooking appliance or is provided by a cooking appliance. The control or regulating device thereby interacts with the display device in such a way that at least one program representative is displayed in the form of a virtual receipt in an area on a virtual receipt board displayed by the display device, after it has been deposited by touching a first part of the area or approaching said first part of the area and/or moved from the second to the third part of the area by touching a second part of the area or approaching said second part of the area and moving or sweeping past to a third part of the area and/or changed in its visual representation by touching at least a fourth part of the area or approaching or moving away from said fourth part of the area and/or at least one further input action, wherein the virtual receipt board enables a representation within a multi-dimensional space based on a coordinate system with at least two position axes for determining a treatment zone of the cooking appliance or at least one position axis for determining a treatment plane, treatment column or treatment line of the cooking region of the cooking appliance and a time axis for determining at least one time of operation of the cooking appliance.

A method for changing at least one display of an operating menu of a cooking appliance on a display device of the cooking appliance after at least one actuation of an input device of the cooking appliance which is at least partially implemented with the display device for providing at least one input display is known from DE 10 2008 032 450 A1, wherein at least one area of the control menu, comprising a graphically represented function and/or function group, an alphanumeric character sequence, an area and/or a symbol, in particular in the manner of a drag and drop function, can be moved by a sweeping touch and/or at least two touches of the input display and/or a sweep past the input display.

Therefore, the object of the invention is to further develop the known method in such a way that the disadvantages of the prior art are overcome.

The object of the invention is solved by the features of claim 1.

SUMMARY

It is provided that a time planning gap characterizing a pause area along the time axis between a first receipt and a second receipt, that follows this first receipt in terms of time, is at least partially closed automatically or triggered by a user by shifting the second receipt towards the first receipt, in particular back to the left along the time axis extending in the x-direction.

The invention proposes that each selected program is associated with a program area along the time axis, in particular per cooking zone or cooking level in a cooking chamber of the cooking appliance, and each receipt is displayed in the associated program area, wherein preferably the extension of the program areas along the time axis remains constant during the course of the respective program, and/or preferably the extension of a receipt parallel to the time axis is automatically adapted to any change in the time requirement of the respective program from selection and/or during the running thereof resulting from a user input and/or determination of the time requirement carried out at at least two, preferably a plurality of, times during the running.

Furthermore, according to the invention, it can be provided that the extension of the program areas along the time axis is determined according to the maximum duration of the respective programs, and/or a receipt for a non-time-guided program, such as a cooking program guided by the core temperature or a cleaning program guided by the degree of cleaning, is composed of a first area determined by the minimum duration of the program and a second area which shortens during the running of the program, the receipt preferably having, at the beginning of the running of the program represented by it, an extension along the time axis characterizing the maximum duration of the program, which extension corresponds in particular to the extension along the time axis of the program area in which the receipt is arranged.

Methods according to the invention are characterized by the following steps:
 a) Determine the existence of at least one planning gap between two consecutive receipts,
 b) Displaying the specific planning gap at least once and/or outputting information on the specific planning gap and/or opening a dialogue interface on the specific planning gap, and
 c) at least partial closure of the specific planning gap in response to a closure request.

It can be provided that
the step a) of determining the planning gap takes place after selection of the at least two programs at the two chronologically consecutive receipts and/or during the running thereof at at least two, preferably a plurality of, points in time, and/or
the step a) of determining the planning gap comprises a duration determination, and/or
the step a) of determining the planning gap comprises a comparison with a minimum time period, and/or
the step a) of determining the planning gap comprises a comparison with a maximum time duration.

The invention further proposes that
the step b) of displaying the determined planning gap comprises a visual highlighting of the pause area resulting from the determined planning gap and/or of the program area temporally adjoining the planning gap and shiftable to close the planning gap, and/or
the step b) of outputting information on the determined planning gap comprises outputting a time duration, on exceeding the minimum time duration and/or on exceeding the maximum time duration, and/or
the step b) of opening the dialogue interface to the determined planning gap depends on the determined time duration, the determined exceeding of the minimum time duration and/or the determined exceeding of the maximum time duration, and/or
the step b) of opening the dialogue interface to the determined planning gap comprises displaying and/or visually highlighting at least one control element, such as in the form of a button, for closing planning gaps.

It can be provided that
a closing request is automatically generated when the minimum time period is exceeded, and/or
a warning message is issued when the maximum duration is exceeded, preferably via the dialogue interface.

Furthermore, it can be provided that
the closure request determines the degree of planning gap closure, the duration of planning gap closure and/or the timing of planning gap closure, and/or
the closure request determines the receipt(s) to be moved and/or the receipt(s) not to be moved, and/or
the closure request is determined as a function of an optimization parameter, preferably determined by a time optimization, a resource optimization and/or a quality optimization, and/or
the closure request is determined as a function of a target time and/or an actual time, and/or
the closure request determines the cooking zone(s), cooking level(s) in which receipts are to be moved, and/or
the closure request is optimized and/or changed by self-learning, starting from a default value.

According to the invention, it is preferred that
the closure request is triggered by operating the control element, and/or
the closure request, in particular in the manner of a drag and drop function, is triggered by a gesture, a swipe past, a swipe touch and/or at least two touches, preferably of an input display indicating the display area and/or comprised by the dialogue interface, wherein preferably at least one trap line is displayed at the end of the planning gap or the planning gap is bounded by two trap lines perpendicular to the time axis.

In addition, it is proposed according to the invention that
between the step b) of opening the dialogue interface and the step c) of at least partially closing the specific planning gap, information on the duration of the specific planning gap, on exceeding the minimum duration, on exceeding the maximum duration, on changing the minimum duration, on changing the maximum duration, on the degree of closure of the planning gap, on the duration of closure of the planning gap and/or on the time of closure of the planning gap is output, in particular displayed, and/or queried, preferably via the input display, and/or
between the step b) of opening the dialogue interface and the step c) of at least partially closing the determined planning gap, information on the climate in the cooking zone or in the cooking level or in the cooking chamber in which the planning gap has been determined, information on the operating mode of the cooking appliance, in particular determined by the first receipt and/or the second receipt, and/or information on at least one further program which can be carried out during the determined planning gap, in particular as a function of the at least two selected consecutive programs and/or the climate and/or the operating mode during the planning gap, is determined and indicated, in particular displayed, during the planning gap.

The invention also proposes that step c) of at least partially closing the determined planning gap comprises bringing forward in time all the programs selected for the cooking zone, for the cooking level or for the cooking chamber in which the planning gap was determined.

Furthermore, it can be provided that the first, second and/or each further receipt can be assigned an attribute, in particular via the dialogue interface, whereby the attribute is preferably determined by a time, costs and/or resources.

It can be provided thereby that the time attribute can be used to fix a receipt in time, so that it cannot be moved along the time axis, and/or the cost attribute can be used to determine the closure request in a cost-optimized manner, such as for minimum weight loss of food, minimum energy consumption, minimum cooking chamber contamination or minimum cleaning agent consumption, and/or the resource attribute can be used to determine the closure request in a resource-optimized manner, such as for minimum electricity, water and/or chemical consumption.

It is also suggested that the first, second and/or each further receipt is respectively representative of a cooking program, a cleaning program, a preheating program, a cooling program, a diagnostic program or pause program.

There may be a large number of planning gaps, all of which can preferably be identified, displayed and closed.

It can be provided that at least one planning gap to be closed can be selected from the multitude of planning gaps, preferably via the dialogue interface.

Furthermore, it can be provided that when closing at least one of the planning gaps from the plurality of planning gaps, at least one further planning gap from the plurality of planning gaps can be taken into account, preferably after selection via the dialogue interface.

The invention further relates to a dialogue interface adapted to perform a method according to the invention, wherein the dialogue interface is provided by the cooking appliance or a remote control for the cooking appliance.

Finally, the invention also relates to a cooking appliance which is set up for carrying out a method according to the invention and comprises a display device with a display area for each cooking zone or cooking level in a cooking chamber, separately or together.

Program planning is of great importance for commercial kitchens. They require optimization of a schedule for the programs to be run in each cooking unit, usually in several respects, such as time, cost and resources.

In a flow chart displayed in the display area of a display device relative to a time axis (x-axis) characteristic of the operation of at least one cooking appliance, vertically parallel lines (y-axis) can be shown to illustrate time spans for time optimization. These lines can be continuous, interrupted or otherwise displayed. The display can be permanent, alternating or as a running line.

Receipts can be assigned attributes. For example, a so-called "Fix Receipt" can be fixed in time so that it cannot be moved. This can be illustrated by a pinning symbol. Other attributes can be costs (dollar/euro symbol) or resources (electricity/water/chemical symbol). Receipts can represent a cooking program, a cleaning program or a diagnostic program, or act as an empty receipt (scheduled pause) or as a representative of other functions (preheat, pre-/rework).

Planning gaps can have different causes, such as
a. General default setting with e.g. gap duration>3 min,
b. Duration of programs or gaps in between set by user,
c. Start or end times selected by the user,
d. On/off switching of a cooking appliance function, and/or
e. Adaptation of core temperature-controlled cooking processes.

A planning gap can be displayed only once per program run or as long as present, depending on the setting by the user. They can be displayed in different ways:
1) By pressing a button in a line for a 2 dimensional display area or a level for a 3 dimensional display area;
2) a separate button in the control panel, e.g. bottom right, which only appears when a planning gap is detected;
3) a separately opening so-called messenger field/dialogue field;
4) by two lines in the display area, in particular over the entire axis/time diagram, to indicate that the gap area lies between the lines; and/or
5) by hatching, coloring, lighting up and/or otherwise visually highlighting gap areas or neighboring areas thereof, in particular an area/sub-area to the right of the gap along the time axis (=receipts lying in the future) to visualize possibilities for change.

Planning gaps can be closed in many ways, such as
i) by a simple swipe gesture, where swiping from right to left, for example, closes a planning gap by moving everything on the right to the left;
ii) by pressing one or more buttons; and/or
iii) after querying parameters in a dialogue window.

A dialogue box allows various queries, e.g. optional, such as the following queries:
A) Which planning gap is to be moved, determined by e.g. a cooking chamber level;
B) where the planning gap should be shifted to, with a maximum of a complete closing up to tgap=0 or only a partial closing with tgap>0 and >tgap max possible;
C) should a (new) time axis be set, or does only a relative shift take place;
D) should the closing be carried out according to a parameter, e.g. optimised in terms of time, quality or weight loss, whereby receipts can also be extended and climate changed within the permissible framework;
E) is a selection to be marked, such as by placing a tick or the like; and/or
F) should a closing and/or shifting of planning gaps be documented, in particular stored, and if so, how and where; and/or
G) should self-learning take place?

A dialogue tree can run as follows, for example:
1. Should a planning gap be closed?
2. No means that no gap closing should take place, and Yes means that gap closing should take place. In the case of one or both alternatives, a dialogue box can also be started. The dialogue box can request different options. With "No", for example, it can be queried whether:
   a. the climate in the cooking chamber and/or the operating mode of the cooking appliance is to be maintained or changed;
   b. the climate in the cooking chamber and/or the operating mode of the cooking appliance of the next receipt is to be generated;
   c. an intermediate cleaning is to be carried out in a planning gap if sufficient time is available; and/or d. a timer should be displayed with the gap time running out?

BRIEF DESCRIPTION OF THE DRAWINGS

Further features and advantages of the invention will be apparent from the following description of embodiments of the invention based on schematic drawings. Thereby show:

FIGS. 1a to 1c show a first sequence plan for a single cooking level for cooking meat and poultry in succession; and FIGS. 2a and 2b show a second flow chart for a plurality of cooking levels for cooking poultry and side dishes in sequence.

DETAILED DESCRIPTION

FIGS. 1a to 1c illustrate the effect of a core temperature-controlled cooking program on a time schedule. Such cooking programs basically have an imprecision in the remaining time to be planned, since the calibre size and the initial temperature of the food to be cooked, e.g. in the form of meat, are not known. This imprecision means that it is common to use an averaged default remaining cooking time as a basis and to use a receipt-slope to indicate the imprecision of the cooking time. Further cooking programs, such as for cooking poultry, can therefore only be placed after the maximum planned time for cooking the meat.

FIGS. 1a to 1c each show a display area 1 for a cooking appliance (not shown) with a level information area 2, a climate and cooking process information area 3 and two cooking program areas 4, 5. A meat receipt 40 representing a meat cooking program is stored in the first cooking program area 4 along a time axis corresponding to the x-axis in FIGS. 1a to 1c and a poultry receipt 50 representing a poultry cooking program is stored in the second cooking program area 5. Since the meat is cooked under core temperature control, the meat receipt 40 is provided with a receipt slope 40a, 40b, 40c. The flat slope of the meat receipt 40 in FIG. 1a illustrates the start of meat cooking, at which point the uncertainty of the remaining time is at a maximum. During cooking, the remaining time updates and the receipt slopes 40b, 40c become steeper, as indicated in FIGS. 1b and 1c, as the determination of the remaining time improves. For further details concerning the change of the meat receipt 40 during the course of the corresponding meat cooking program, which is core temperature guided, reference is made to the disclosure content of DE 10 2010 036 639 A1 of the applicant.

In FIGS. 1b and 1c, the position of the receipts 40, 50 arranged in the time window determined by the respective cooking program area 4, 5 does not change automatically. Thus, there is no automatic "moving up" of the poultry receipt 50 to the left, since it is conceivable that there is a desired output time for the cooked poultry that is not to be changed. If there is no such time specification, it is possible to "move up" and thus close a planning gap, e.g. by a user actively pulling the poultry receipt 50 to the left so that it directly follows the meat receipt 40, which is not shown, however. As an alternative or in addition to the pull, a wiping movement or pressing a button is also possible.

Of course, planning gaps can occur in a cooking appliance with many cooking levels, in each of the cooking levels. A planning gap does not have to depend only on a selected cooking program, but can also be forced by a user, e.g. by actively shortening/cancelling a cooking program or by removing a cooking program from the planning.

If, in the course of cooking in a cooking appliance with a large number of cooking levels or during the planning of the same, a receipt is shortened, either by user intervention or due to the program, it can first be checked whether the shortening exceeds a specified minimum duration and, if so, in which cooking level(s). If there is a reduction of at least the minimum time over all cooking levels that are loaded with food or are to be loaded, the presence of such a planning gap can be made visually perceptible, e.g. by displaying a button. The closing of planning gaps can then take place at the user's request, by means of a simple operation, i.e. pressing a button.

Such a constellation is shown in FIGS. 2a and 2b. In each case, a display area 10 for a cooking appliance (not shown) is shown with a cooking chamber information area 11 and a number of level information areas 12 corresponding to the number of cooking levels of the cooking appliance. A level information area 12, a climate and cooking process information area 13 and a first cooking program area 15 are assigned to cooking level 5, which is equipped with poultry in the example shown, followed by a pause area 17, which is followed by second cooking program areas 16 for cooking levels 5, 3 and 2, which are to be equipped with side dishes. The loading is illustrated with receipts 50, 60, 60', 60". It can be seen from the receipts that the cooking of poultry started at 10:45 in cooking level 5 and that the cooking of side dishes is to take place at 10:51 in cooking levels 5, 3 and 2, see the poultry receipt 50 and the 3 side dish receipts 60, 60', 60". Between the poultry receipt 50 on the one hand and the 3 side dish receipts 60, 60', 60" on the other hand, a planning gap 70 is shown by two vertically running lines 71, 72. Since this planning gap 70 exceeds a minimum duration, FIGS. 2a and 2b also show a button 73a, 73b for closing the planning gap.

In the variant shown in FIG. 2a, the button 73a for closing planning gaps is shown below the level information areas 12 for all 10 cooking levels, namely in the cooking chamber information area 11, in which a temperature graph 80 and a humidity graph 90 are also shown to illustrate the climate in the cooking chamber. In the variant shown in FIG. 2b, the button 73b for closing planning gaps is shown between the two lines 71, 72 at the level of cooking level 5 where the poultry is cooked.

As soon as a detection of the length of the planning gap 70, namely in the cooking levels 5, 3 and 2 to be loaded with food, has been carried out and it has been determined that a minimum time period has been exceeded, the user is informed by the appearance of the button 73a for closing the planning gap in FIG. 2a or the button 73b for closing the planning gap in FIG. 2b that the planning gap can be closed by pressing this button. When closing the planning gap, the complete block of side-dish-receipts 60, 60', 60" is moved. In the process, the 3 side-dish-receipts 60, 60', 60" following the poultry receipt 50 are shifted to the left in FIG. 2a or 2b, but this is not shown. This does not result in any new cooking program combinations, but only in a time shift forward, which means time optimization, which also saves energy.

Alternatively, it is also possible that automatic "moving up" always takes place during function planning and cooking, so that there are basically no planning gaps. The "moving up" can take place in selected cooking levels or in all cooking levels and/or at all times or at certain times. It is also possible to specifically exclude "moving up", e.g. by marking certain cooking paths, because they are planned for a certain target time, or by setting at least one so-called "Fix Receipt", which is fixed in time and therefore cannot be moved, e.g. in order to plan break times in a commercial kitchen.

The features of the invention disclosed in the foregoing description, the claims and drawings may be essential, both individually and in any combination, to the realisation of the invention in its various embodiments.

LIST OF REFERENCE SIGNS

1 Display area
2 Level information area
3 Climate and cooking process information area
4 Cooking program area
5 Cooking program area
6 Cooking program area
10 Display area
11 Cooking chamber information area
12 Level information area
13 Climate and cooking process information area
15 Cooking program area
16 Cooking program area
17 Pause area
40 Meat Receipt
40a, 40b, 40c Receipt slope
50 Poultry receipt
60, 60', 60" Side Dish receipt
70 Planning gap
71 Line
72 Line
73a, 73b Button for closing planning gaps
80 Temperature graph
90 Humidity graph

The invention claimed is:

1. A method for arranging visualized programs for at least one cooking appliance comprising at least one display device having a display area for each cooking level in a cooking chamber having a plurality of cooking levels along a time axis extending to the right in the x-direction, comprising:
receiving a selection of at least two programs from a plurality of programs;
receiving a chronological order for the selected programs;
displaying the selected programs the display area of the at least one display device, wherein each of the selected programs is displayed in the form of a virtual receipt representing the program displayed along the time axis based on the chronological order, and wherein the extension of each displayed virtual receipt along the time axis is characteristic of a duration of the respective associated program,
wherein a time planning gap characterizing a pause region along the time axis between a first virtual receipt and a second virtual receipt following the first virtual receipt in terms of time is at least partially closed automatically or triggered by a user by shifting the second virtual receipt towards the first virtual receipt to the left along the time axis extending in the x-direction, through at least the following steps:
determining the presence of a scheduling gap between two chronologically successive virtual receipts, wherein the step of determining the presence of a scheduling gap comprises a comparison with a minimum time period,
displaying the determined scheduling gap, and
at least partially closing the scheduling gap in response to a closure request, wherein the step of at least partially closing the scheduling gap comprises bringing forward in time all programs selected for the cooking chamber in which the scheduling gap was determined,
wherein the scheduling gap is at least partially closed in order to optimize a schedule of programs to be run in the cooking chamber with respect to time, cost, and resources; and
executing the schedule of programs to cause the cooking chamber to successively adjust a climate of the cooking chamber to cook food products.

2. The method of claim 1, wherein
each selected program is assigned a program area along the time axis, and
each virtual receipt is displayed in an associated program area, wherein
an extension of the program areas along the time axis remains constant during the course of the respective program area, or
an extension of a virtual receipt parallel to the time axis is automatically adapted to any change in a time requirement of the respective program.

3. The method of claim 2, wherein
the extension of the program areas along the time axis is determined according to a maximum duration of the respective program, or
a virtual receipt for an untimed program includes a first area determined by a minimum time duration of the program and a second area shortening during a running of the program areas.

4. The method of claim 3, wherein
the virtual receipt has, at the beginning of an execution of the program represented by the virtual receipt, an extension along the time axis characterizing the maximum duration of the program.

5. The method of claim 1, wherein the step of determining the scheduling gap takes place after selection of the at least two programs at two temporally successive receipts and during the running thereof at least two points in time.

6. The method of claim 1, wherein the step of opening a dialogue interface to the scheduling gap comprises an indication of the scheduling gap by a visual highlighting of a pause area resulting from the scheduling gap and of the program area temporally adjoining the scheduling gap and displaceable for closing the scheduling gap.

7. The method of claim 1, wherein the step of opening a dialogue interface to the scheduling gap comprises outputting information on the scheduling gap in the form of outputting a time duration, on exceeding a minimum time duration and/or on exceeding a maximum time duration.

8. The method of claim 1, wherein the step of opening the dialogue interface to the scheduling gap depends on a determined time duration, the determined time duration exceeding a minimum time duration or a maximum time duration.

9. The method of claim 1, wherein the step of opening the dialogue interface to the scheduling gap comprises displaying and/or visually highlighting at least one planning gap closing control element.

10. The method of claim 7, wherein
a closing request is automatically generated when the minimum time duration is exceeded, and
a warning message is issued when the maximum time duration is exceeded.

11. The method of claim 1, wherein the closure request determines a degree of the scheduling gap closure, a duration of the scheduling gap closure and/or a timing of the scheduling gap closure.

12. The method of claim 1, wherein the closing request determines one or more virtual receipt to be moved and/or one or more virtual receipt not to be moved.

13. The method of claim 1, wherein
the closure request is determined as a function of an optimization parameter, or
the closing request is determined depending on a target time or an actual time.

14. The method of claim 1, wherein a closure prompt determines one or more cooking zone or cooking levels in which virtual receipts are to be moved.

15. The method of claim 1, wherein the closing request is optimized and/or changed by self-learning, starting from a default value.

16. The method of claim 1, wherein
the closure request is triggered by operating the control element, and
a closing prompt is triggered by a gesture, a brush past, a sweeping touch and/or at least two touches.

17. The method of claim 16, wherein at least one trap line is displayed at an end of the scheduling gap or the scheduling gap is delimited by two trap lines perpendicular to the time axis.

18. The method of claim 1, wherein a virtual receipt can be assigned an attribute, wherein the attribute is determined by a time, cost and/or resource.

19. The method of claim 18, wherein the time attribute can be used to fix a receipt in time so that it cannot be moved along the time axis.

20. The method of claim 1, wherein the scheduling gap to be closed can be selected from a plurality of planning gaps.

21. The method of claim 20, wherein when closing the scheduling gap, at least one further scheduling gap from the plurality of planning gaps can be taken into account.

22. A dialogue interface arranged to perform the method of claim 1, wherein the dialogue interface is provided by the cooking appliance or a remote control for the cooking appliance.

23. A cooking appliance adapted to perform the method of claim 1, comprising the display device having a display area for each cooking level in a cooking chamber jointly.

* * * * *